United States Patent [19]
Hosur et al.

[11] Patent Number: 6,166,622
[45] Date of Patent: Dec. 26, 2000

[54] TIME SLOT STRUCTURE FOR IMPROVED TPC ESTIMATION IN WCDMA

[75] Inventors: Srinath Hosur; Timothy M. Schmidl, both of Dallas; Anand G. Dabak, Richardson, all of Tex.

[73] Assignee: Texas Instruments Incorporated, Dallas, Tex.

[21] Appl. No.: 09/181,109

[22] Filed: Oct. 28, 1998

[51] Int. Cl.[7] .................................................. G08B 23/00
[52] U.S. Cl. ......................... 340/318; 340/316; 340/539; 455/127
[58] Field of Search ..................... 340/316, 531, 340/539, 310.06, 825.31, 825.34, 317, 318; 370/208, 209, 335, 342; 375/200, 267, 295, 335, 345; 455/424, 442, 127, 276.1, 278.1

[56] References Cited

U.S. PATENT DOCUMENTS

| | | | |
|---|---|---|---|
| 5,056,109 | 10/1991 | Gilhousen et al. | 455/69 |
| 5,602,834 | 2/1997 | Dean et al. | 370/335 |
| 5,640,414 | 6/1997 | Blakeney, II et al. | 375/200 |
| 5,655,220 | 8/1997 | Weiland et al. | 455/69 |
| 5,715,236 | 2/1998 | Gilhousen et al. | 370/209 |
| 5,815,798 | 9/1998 | Bhagalia et al. | 455/13.4 |
| 5,870,393 | 2/1999 | Yano et al. | 370/335 |
| 5,915,216 | 9/1999 | Lysejko | 455/422 |
| 5,956,649 | 9/1999 | Mitra et al. | 455/522 |
| 5,999,816 | 12/1999 | Tiedemann, Jr. et al. | 455/437 |

OTHER PUBLICATIONS

"Performance of Pilot Symbol–Assisted Coherent RAKE Receiver Using Weighted Multi–Slot Averaging for DS–CDMA Mobile Radio," Andoh, et al., Technical Report of IEICE, Aug. 1997, pp. 1–21 (English and Japanese).

"Experimental Performance of Coherent RAKE Receiver Using Weighted Multi–Slot Averaging Pilot Symbol Assisted Channel Estimation for DS–CDMA," Andoh, et. al., Proceedings of IEICE, 1998, pp. 1–6 (English and Japanese).

"Flexible Power Allocation for Downlink DPCCH Fields", Tdoc SMG2 UMTS–L1 168/98, Nokia, '98, 9 sheets.

"DS–CDMA Pilot and Data Symbol–Assisted Coherent Multistage Interference Canceller Using Repeatedly Updated Channel Estimation", Sawahashi, et al., Proceedings of IEEE ICCS/ISPACS 1996, pp. 585–589.

"Pilot Assisted Coherent DS–CDMA Reverse–Link Communications with Optimal Robust Channel Estimation", Ling, Fuyun, Proceedings of ICASSP 1997.

"Multiuser Detection for Downlink CDMA Communications in Multipath Fading Chanel," Wichman, et. al., Proceedings of VTC '97, pp. 572–576.

Primary Examiner—Jeffery A. Hofsass
Assistant Examiner—Van T. Trieu
Attorney, Agent, or Firm—Robert N. Rountree; Frederick J. Telecky, Jr.

[57] ABSTRACT

A communication circuit is designed with a processing circuit (11) coupled to receive a plurality of first control signals (402, 408) from a source external to the communication circuit. The processing circuit produces a second control signal (432, 434) and a second power control (422, 436) signal during each of a plurality of predetermined time periods. The second power control signal is determined by a corresponding first control signal from said plurality of first control signals. The second power control signal is produced proximate the second control signal. A serial circuit is coupled to receive the second control signal and the second power control signal during a respective predetermined time period. The serial circuit produces the second control signal proximate the second power control signal.

28 Claims, 2 Drawing Sheets

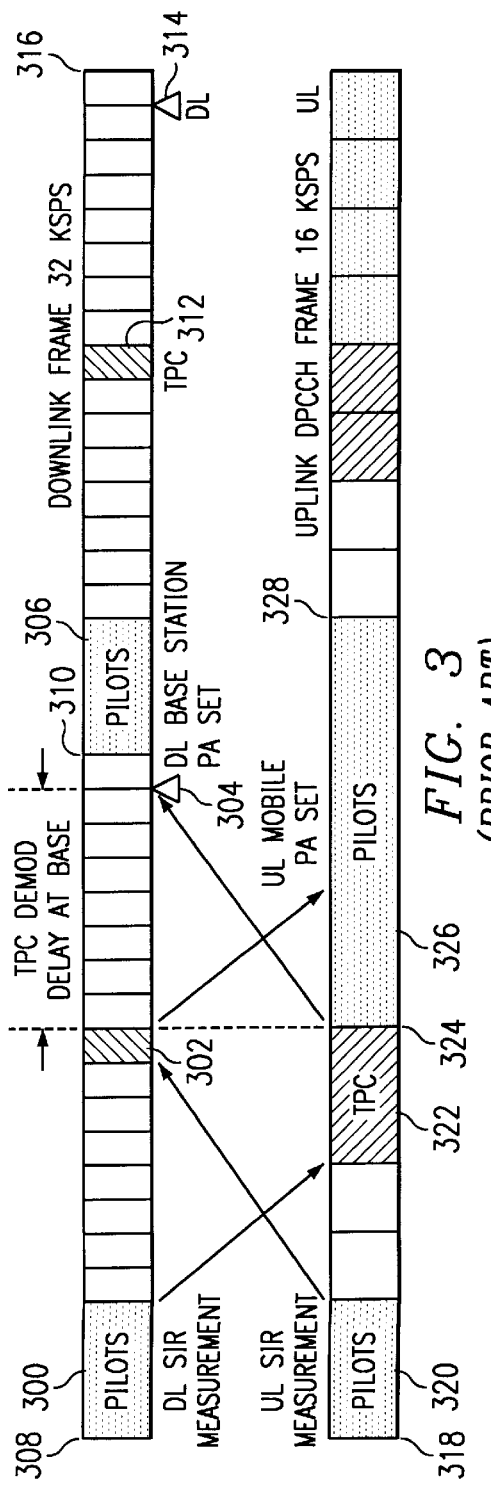
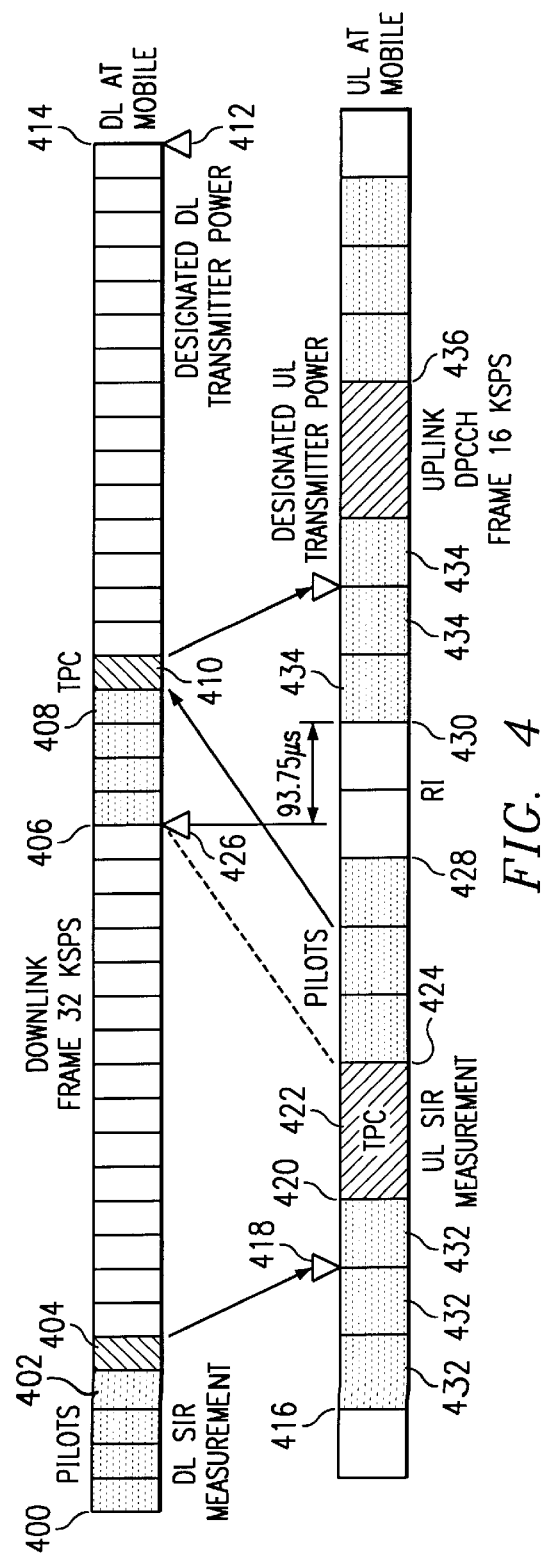

TIME SLOT STRUCTURE FOR IMPROVED TPC ESTIMATION IN WCDMA

FIELD OF THE INVENTION

This invention relates to wideband code division multiple access (WCDMA) for a communication system and more particularly to improved transmission power control (TPC).

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. patent application Ser. No. 60/082,671, filed Apr. 22, 1998, and incorporated herein by reference. These WCDMA systems are coherent communications systems with pilot symbol assisted channel estimation. These pilot symbols are transmitted as quadrant phase shift keyed (QPSK) known data in predetermined time frames to any receivers within range. The frames propagate in a discontinuous transmission (DTX) mode, so transmission occurs when a user speaks, but no transmission takes place when the user listens. The pilot symbols are equally spaced in time among sixteen predetermined time slots within the frame. Each time slot further includes transmit power control (TPC) and data symbols in both downlink (received) and uplink (transmitted) signals. Received pilot symbols are compared to known pilot symbols to calculate a channel estimate, to demodulate TPC and data symbols and to determine a signal-to-interference ratio (SIR).

A problem arises, however, with increasing velocity of the mobile unit with respect to the base station. Increasingly high Doppler frequencies cause the magnitude and phase of a received signal to change rapidly. Such rapid changes cause greater errors in the channel estimate and result in increased demodulation errors of TPC symbols. These demodulation errors of TPC symbols result in improper transmission power control and compromise communication between a mobile unit and a base station.

SUMMARY OF THE INVENTION

These problems are resolved by a communication circuit comprising a processing circuit coupled to receive a plurality of first control signals from a source external to the communication circuit. The processing circuit produces a second control signal and a second power control signal during each of a plurality of predetermined time periods. The second power control signal is determined by a corresponding first control signal from said plurality of first control signals. The second power control signal is produced proximate the second control signal. A serial circuit is coupled to receive the second control signal and the second power control signal during a respective predetermined time period. The serial circuit produces the second control signal proximate the second power control signal. The present invention greatly reduces signal demodulation errors at high Doppler frequencies.

BRIEF DESCRIPTION OF THE DRAWINGS

A more complete understanding of the invention may be gained by reading the subsequent detailed description with reference to the drawings wherein:

FIG. 3 is a diagram showing a time slot structure of the prior art;

FIG. 4 is a diagram showing a time slot structure of the present invention; and

DETAILED DESCRIPTION OF THE PREFERRED EMBODIMENTS

Figure 1:
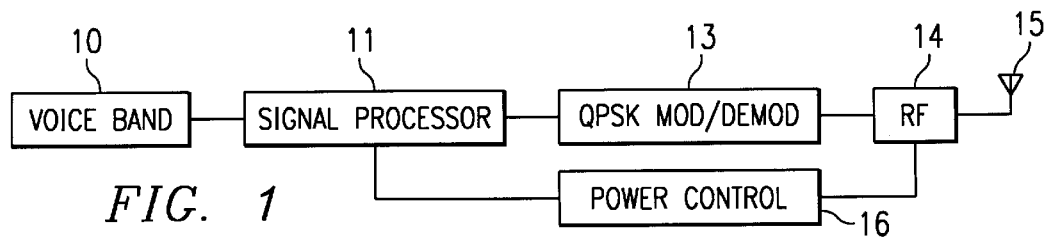
FIG. 1 is a simplified block diagram of a typical cellular phone.

Referring to FIG. 1, there is a simplified block diagram of a typical cellular phone. A data reception or downlink operation begins when data is received by antenna 15 and amplified by RF circuit 14. The amplified data is demodulated by the QPSK demodulator 13 and decoded by RF code 12. A signal processor receives the serial stream of decoded data including pilot symbols and transmit power control (TPC) symbols in a serial circuit (not shown). The signal processor processes the data to provide a channel estimate, correct phase and magnitude of the data signal and relay the data signal to the voice band circuit.

A data transmission or uplink operation operates in the reverse order. The signal processor 11 receives data signals from the voice band circuit. The signal processor then loads these data signals into a serial circuit (not shown) together with pilot symbols, TPC symbols and other control signals. These TPC symbols are power control signals that are calculated in response to previously received pilot symbols. They are transmitted in the uplink operation to alert a remote station to increase or decrease transmission power. The serial circuit transmits these signals in a predetermined time frame as will be described in detail. The data signals are then encoded by RF code circuit 12 and modulated by the QPSK modulator circuit 13. The modulated signal is then amplified by RF circuit 14 and transmitted by antenna 15. Power of the RF transmitter is controlled by power control circuit 16 in response to TPC symbols that were previously received from the remote station during the downlink operation.

Figure 2:
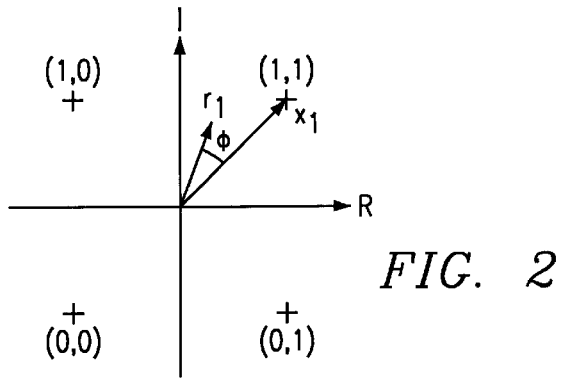
FIG. 2 is a diagram showing the magnitude and phase distortion of a received signal with respect to a transmitted signal.

The diagram of FIG. 2 shows each of four pilot symbols as a two-bit symbol representing a respective quadrant. A transmitted pilot symbol, for example $x_1$, has a binary value (1,1) representing the upper right quadrant. The corresponding received pilot symbol $r_1$, however, differs in both magnitude and phase $\phi$ from the transmitted pilot symbol. When this magnitude and phase difference for the pilot symbol is the same as a magnitude and phase difference for a TPC symbol, the TPC symbol will be correctly demodulated. A significant deviation of the magnitude and phase of the TPC symbol from that of the pilot symbols, however, will produce an incorrectly demodulated TPC symbol. This incorrectly demodulated TPC symbol will incorrectly set transmission power and compromise operation of the communication system.

Turning now to FIG. 3, there is a diagram showing a predetermined time slot structure of the prior art. The time slot is one of sixteen in a 10-millisecond downlink frame. Each time slot has a duration of 625 microseconds. An exemplary time slot begins at time 308 with pilot symbols 300 and ends at time 310. Each group of pilot symbols is transmitted at the beginning of the time slot by the remote base station. For the exemplary downlink data rate of 32 K symbols per second (KSPS), there are twenty symbols in each time slot. Each symbol, therefore, has a 31.25 microsecond duration. The TPC symbol is transmitted as the eighth symbol following pilot symbols 300. The elapsed time from pilot symbol reception to TPC symbol reception, therefore, is 250 microseconds.

In operation, a remote base station transmits the downlink frame including the data in the time slot from time 308 to time 310. A mobile station receives the data and the resident signal processor calculates a signal-interference ratio (SIR) from pilot symbols 300. The signal processor also produces pilot symbols 320 and TPC symbol 322 for transmission by the serial circuit at a predetermined data rate. The TPC symbol 322, determined by the received pilot symbols 300, is included in the uplink to direct an increase or decrease in base station transmitting power of preferably ±1 dB. This increase or decrease in base station power is completed at time 304 as indicated by the triangle. Thus, transmitted power for data within the next time slot beginning at time 310 will be adjusted according to signal strength of pilot symbols 300 of the preceding time slot.

Figure 5:
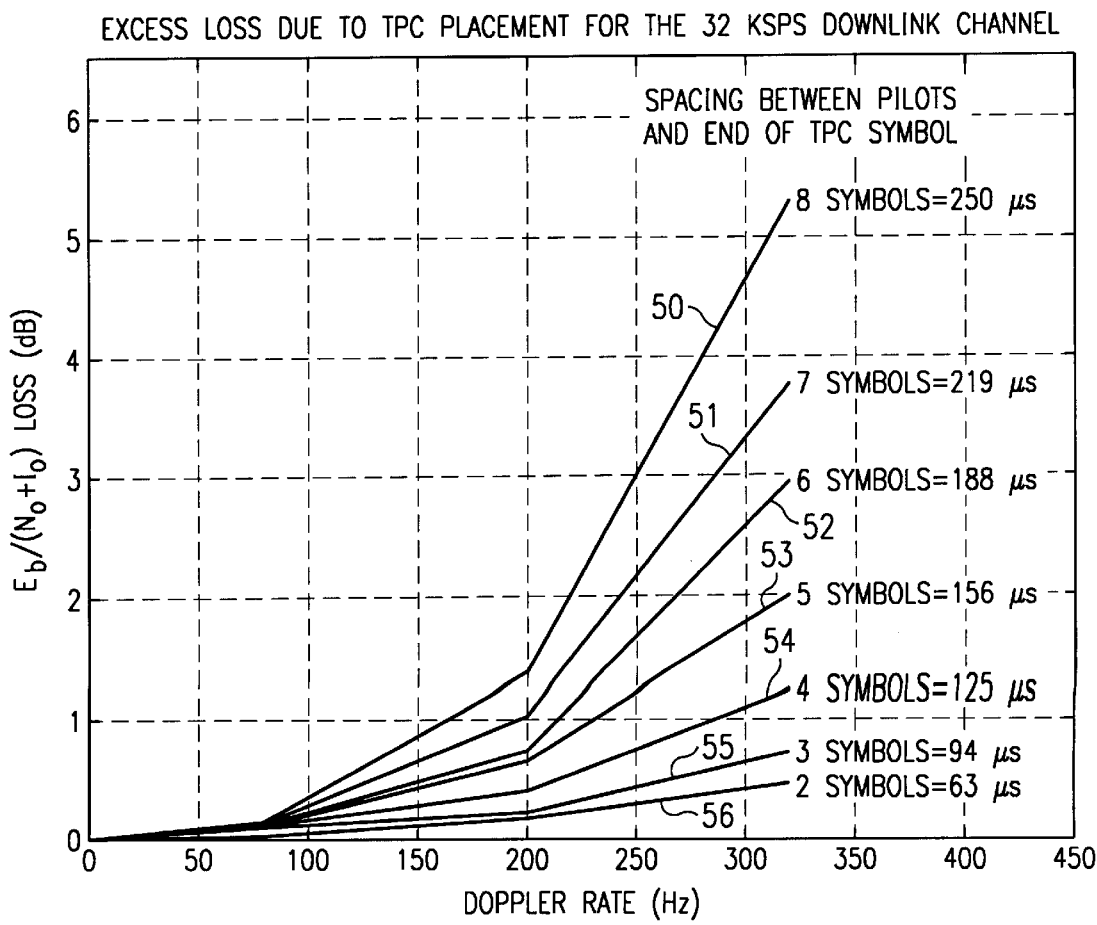
FIG. 5 is a simulation showing signal loss at high Doppler frequencies.

The signal processor also calculates magnitude and phase errors of the pilot symbols. Results of this calculation are used to demodulate the received TPC symbol 302. This TPC symbol 302, however, is received eight symbols or 250 microseconds after pilot symbols 300 of the respective time slot. The simulation of FIG. 5 shows the signal loss due to this delay in terms of a ratio of energy-per-bit to a sum of noise and interference $E_b/(N_o+I_o)$ as a function of the Doppler rate. The result of eight-symbol delay of FIG. 3 is illustrated by curve 50. At a maximum simulated Doppler frequency of 320 Hz, a substantial signal loss of 5.2 dB is observed. The loss decreases substantially with a decrease in spacing between the end of pilot symbols 300 and the end of TPC symbol 302. Curve 51 shows a reduced loss of 3.8 dB. An even more substantial improvement to a loss of only 2.9 dB is observed when the TPC symbol is proximate the pilot symbols at a six symbol delay. This six-symbol delay is highly advantageous in reducing demodulation error of TPC symbols. By way of comparison, the eight-symbol delay suffers an 80% greater signal loss. This same advantage also accrues at lesser Doppler frequencies. A comparison of curve 52 (1.33 dB) to curve 50 (0.74 dB) at 200 Hz, for example, shows the same 80% greater signal loss for the eight-symbol spacing. Thus, a significant advantage is realized by receiving and demodulating the TPC symbol within the first half of each respective time slot. This is achieved at 32 KSPS when the TPC symbol is received no more than six symbols after the pilot symbols. Alternatively, this is achieved at 16 KSPS when the TPC symbol is received no more than three symbols after the pilot symbols Referring now to FIG. 4, there is a diagram of a time slot having an embodiment of the present invention. The exemplary time slot begins at time 400 with the transmission of four pilot symbols 402 by the serial circuit. The pilot symbols are proximate the TPC symbol 404 with a one-symbol delay. This TPC symbol 404 is demodulated based on information from pilot symbols 402. With reference to FIG. 5, signal loss for this one-symbol delay is expected to be less than 0.5 dB even at the maximum simulated Doppler frequency of 320 Hz. The demodulated TPC bit is used to increase or decrease power in the subsequent uplink signal at time 418 as indicated by the triangle. The signal processor also calculates a SIR ratio from pilot symbols 432 that is used to produce TPC symbol 422. The pilot symbols 432 from the signal processor are transmitted proximate the TPC symbol 422 in the uplink by the serial circuit. The TPC symbol 422 is received and used to set the transmitted power level at the base station at time 426 as indicated by the triangle. Thus, the next downlink time slot beginning at time 406 will have a power level determined by pilot symbols 402 of the previous time slot.

Although the invention has been described in detail with reference to its preferred embodiment, it is to be understood that this description is by way of example only and is not to be construed in a limiting sense. For example, an advantage of the present invention accrues for any time slot in the uplink or downlink where the TPC symbol is proximate the pilot symbols within the first half of the time slot. This advantage is realized for all Doppler frequencies, but more significantly for frequencies greater than 80 Hz. Another embodiment of the present invention includes user data identification symbols (UDI) transmitted in the exemplary time slot (400–406) proximate pilot symbols 402 and preferably before TPC symbol 404. These UDI symbols indicate a presence or absence of data symbols within the frame and are preferably included in the first of sixteen time slots in the frame. These UDI symbols are advantageous in conserving power and computation time of the signal processor absent data symbols in the frame.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A communication circuit, comprising:
  a processing circuit coupled to receive a plurality of first control signals from a source external to the communication circuit, the processing circuit producing a second control signal and a second power control signal during each of a plurality of predetermined time periods, wherein the second power control signal is determined by a corresponding first control signal from said plurality of first control signals and wherein the second power control signal is produced proximate the second control signal; and
  a serial circuit coupled to receive the second control signal and the second power control signal during a respective predetermined tire period, the serial circuit producing the second control signal proximate the second power control signal.

2. A communication circuit as in claim 1, wherein each of the plurality of first control signals comprises a plurality of pilot symbols.

3. A communication circuit as in claim 2, wherein the second control signal comprises a plurality of pilot symbols, and the second power control signal is a transmit power control symbol.

4. A communication circuit as in claim 1, wherein said second control signal proximate the second power control signal are both produced during a first half of said respective predetermined time period.

5. A communication circuit as in claim 1, further comprising a power control circuit coupled to the processing circuit, wherein the processing circuit is further coupled to receive a first power control signal proximate the first control signal and wherein the power control circuit produces a signal for controlling a transmitting power of a radio frequency transmitter circuit in response to the first power control signal.

6. A communication circuit as in claim 5, wherein each of the first and the second control signals comprises a plurality of pilot symbols and each of the first and the second the power control signals is a transmission power control symbol.

7. A communication circuit as in claim 5, wherein said first power control signal proximate the first control signal are both received during a time no greater than half of said predetermined time period.

8. A communication circuit as in claim 1, wherein the second power control signal produced proximate the second control signal includes no more than one intervening signal between the second power control signal and the second control signal.

9. A communication circuit as in claim 8, wherein each of the second power control signal, the second control signal and the intervening signal are symbols, each symbol including an imaginary and a real component.

10. A communication circuit, comprising:
    a receiving circuit coupled to receive a first control signal and a first power control signal from a source external to the communication circuit during a first predetermined time, the first control signal approximate the first power control signal;
    a processing circuit producing a second power control signal in response to the first control signal; and
    a transmitting circuit coupled to receive the second power control signal, the transmitting circuit transmitting a second control signal proximate the second power control signal during a second predetermined time.

11. A communication circuit as in claim 10, wherein each of the first and second control signals comprises a respective plurality of pilot symbols.

12. A communication circuit as in claim 11, wherein each of the first and second power control signals comprises a transmit power control symbol.

13. A communication circuit as in claim 10, wherein said first control signal proximate the first power control signal are both produced during a first half of said first predetermined time period.

14. A communication circuit as in claim 13, wherein said second control signal proximate the second power control signal are both produced during a first half of said second predetermined time period.

15. A communication circuit as in claim 14, wherein said proximate spacing is no more than six symbols.

16. A communication circuit as in claim 14, wherein said receiving circuit is further coupled to receive data signals proximate the first power control signal.

17. A communication circuit as in claim 16, wherein said receiving circuit is further coupled to receive user data identification signals proximate the first control signal.

18. A communication circuit as in claim 10, wherein a transmitted power of the transmitting circuit is determined by the first power control signal.

19. A communication circuit as in claim 10, wherein a transmitted power of said source external to the communication circuit is determined by the second power control signal.

20. A communication circuit as in claim 10, wherein the receiving circuit is an input circuit of the processing circuit and the transmitting circuit is an output circuit of the processing circuit and wherein the receiving circuit, the processing circuit and the transmitting circuit are formed on a single integrated circuit.

21. A communication circuit as in claim 10, wherein the first control signal proximate the first power control signal includes no more than one intervening signal between the first control signal and the first power control signal, and wherein the second control signal proximate the second power control signal includes no more than one intervening signal between the second control signal and the second power control signal.

22. A communication circuit as in claim 21, wherein each of the control signals, the power control signals and the intervening signals are symbols, each symbol including an imaginary and a real component.

23. A method of controlling transmitted power in a communication circuit, comprising the steps of:
    receiving a plurality of first control signals from a source external to the communication circuit during a predetermined time;
    receiving a first power control signal proximate the plurality of first control signals and during the predetermined time; and
    adjusting a gain of a power amplifier circuit in response to the first power control signal.

24. A method of controlling transmitted power in a communication circuit as in claim 23, wherein said first power control signal proximate the plurality of first control signals are both received within a time no greater than half the predetermined time.

25. A method of controlling transmitted power in a communication circuit as in claim 23, further comprising the step of producing a plurality of second control signals and a second power control signal, the plurality of second control signals proximate the second power control signal during a time no greater than half the predetermined time.

26. A method of controlling transmitted power in a communication circuit as in claim 25, further comprising the step of calculating the second power control signal in response to at least the plurality of first control signals.

27. A method as in claim 23, wherein the first power control signal proximate the plurality of first control signals includes no more than one intervening signal between the first power control signal and the plurality of first control signals.

28. A method as in claim 27, wherein each of the first power control signal, the first control signals and the intervening signal are symbols, each symbol including an imaginary and a real component.

* * * * *

UNITED STATES PATENT AND TRADEMARK OFFICE
CERTIFICATE OF CORRECTION

| | |
|---|---|
| PATENT NO. | : 6,166,622 |
| DATED | : December 26, 2000 |
| INVENTOR(S) | : Srinath Hosur, Timothy M. Schmidl and Anand G. Dabak |

It is certified that error appears in the above-identified patent and that said Letters Patent is hereby corrected as shown below:

Column 5,
Line 34, "approximate" should be -- proximate --.

Signed and Sealed this

Tenth Day of January, 2006

JON W. DUDAS
*Director of the United States Patent and Trademark Office*